No. 733,716. PATENTED JULY 14, 1903.
T. J. HALL.
CARPET STRETCHER.
APPLICATION FILED AUG. 4, 1902.
NO MODEL.
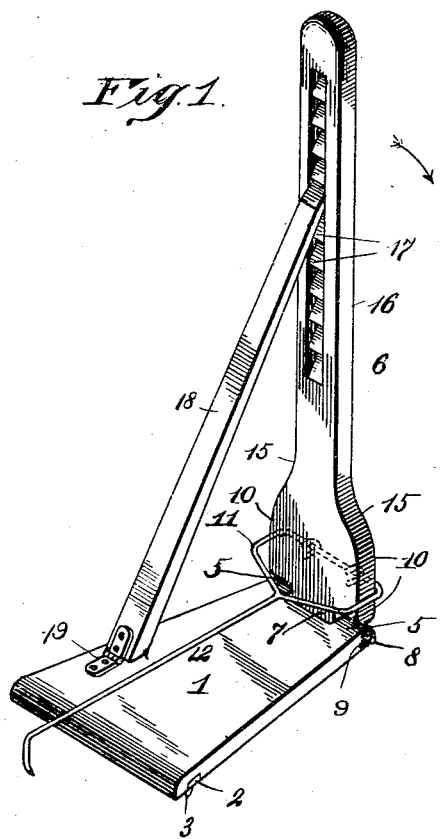
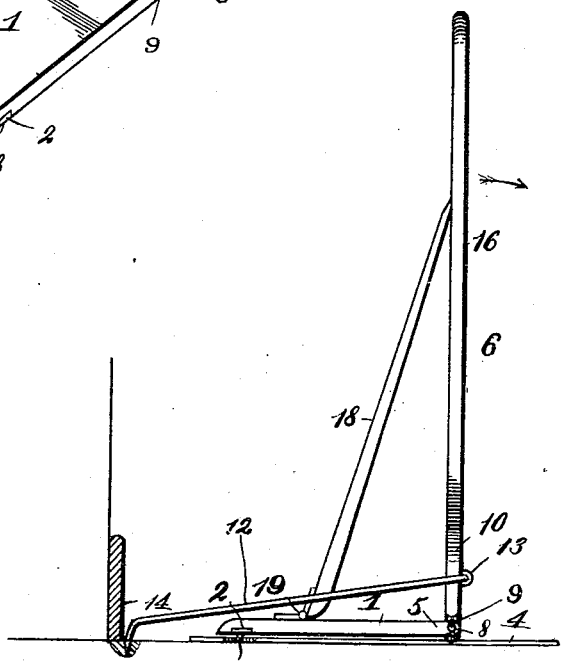
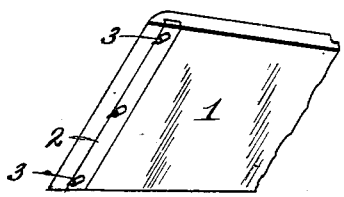
Witnesses:
Inventor:
T. J. Hall.

No. 733,716.

Patented July 14, 1903.

UNITED STATES PATENT OFFICE.

THOMAS J. HALL, OF BLUE RAPIDS, KANSAS.

CARPET-STRETCHER.

SPECIFICATION forming part of Letters Patent No. 733,716, dated July 14, 1903.

Application filed August 4, 1902. Serial No. 118,213. (No model.)

*To all whom it may concern:*

Be it known that I, THOMAS J. HALL, a citizen of the United States, residing at Blue Rapids, in the county of Marshall and State of Kansas, have invented certain new and useful Improvements in Carpet-Stretchers, of which the following is a specification.

My invention relates to certain new and useful improvements in carpet-stretchers; and it may be said to consist in the novel arrangement and combination of parts hereinafter described, and pointed out in the claim.

The object of my invention is to provide a device of this character which is simple and inexpensive of construction, convenient and easy to operate, and thoroughly effective for the purpose intended.

In order that others skilled in the art to which it appertains may readily make and use the same, reference will now be made to the accompanying drawings, in which—

Figure 1 represents a perspective view of the improved carpet-stretcher. Fig. 2 is a side elevation of the same in position for operation. Fig. 3 is a broken detail perspective view of the base-plate.

Similar reference-numerals indicate corresponding parts throughout the several views.

In constructing the device I employ a base-plate 1, which tapers rearwardly from its forward end and is provided at its forward under portion with a countersunk transverse metallic strip 2, having a series of pins 3 projecting forwardly from the under side thereof at an angle approximating forty-five degrees and adapted to engage the carpet 4, which it is desired to stretch. The reduced rear portion of the base-plate is notched to provide two oppositely-disposed ears 5, between which an operating-lever 6 is pivotally secured at its reduced lower end 7 by a removable transverse-headed pin 8, held in position by a spring-cotter 9. The lower portion 7 of the lever slightly above the top of the base-plate is provided with oppositely-disposed shoulders 10, which widen the lever at this portion to provide a broad bearing-surface for bail 11, formed on the rear end of a dog 12. Said bail is hinged to the rear side of the lever by staples 13, so its hooked forward end is free to move up or down to engage the floor at mop-board 14, while the bail acts as a fulcrum on which the lever operates. Shoulders 10 extend above the bail a suitable distance and curve inwardly, as at 15, and then upwardly to form a handle portion 16 for the lever. The front upper portion of the lever is provided with a series of countersunk ratchet-teeth 17, adapted to be engaged by the upper end of a pawl 18, which is secured at its lower end by a hinge 19 to the top of the base-plate at one side of the dog.

In operation the dog is hooked to the floor against or it may be hooked behind the mopboard, as shown in Fig. 2, and the pins 3 are forced into the carpet near its free edge, while the lever is supported in an approximately upright position by said dog, the pawl engaging one of the upper teeth of the ratchet. Then as the upper end of the lever is pulled backward in the direction indicated by the arrow it swings on its fulcrum 13, and its lower end, together with the base-plate and the edge of the carpet, is pushed forward until the latter is brought in contact with the mop-board, where it is held by the pawl 18 and teeth 17 until tacked down, as will be readily understood.

When the device is not in use, the parts may be disconnected by removing pin 8 and the pawl and dog folded down against the base-plate, so it will occupy but little space when stored away or packed for transportation.

Having thus described the invention, what I claim as new, and desire to secure by Letters Patent, is—

A carpet-stretcher, comprising a base-plate, pins on the under side thereof, oppositely-disposed ears on one end of the base-plate, a lever pivoted at its lower end between said ears, ratchet-teeth in the upper front portion of the lever, a pawl hinged upon the base-plate and adapted to engage the ratchet-teeth at its upper end, and a dog pivoted at its rear end to the lever and having its front end projecting past the pawl and over the forward portion of the base-plate, substantially as described.

In testimony whereof I affix my signature in the presence of two witnesses.

THOMAS J. HALL.

Witnesses:
W. J. BURR,
F. O. WAYWANT.